(12) United States Patent
Reyes

(10) Patent No.: US 11,333,332 B1
(45) Date of Patent: May 17, 2022

(54) REMOTE CONTROLLED MOVING LIGHTING SYSTEM

(71) Applicant: Eduardo Reyes, Miami, FL (US)

(72) Inventor: Eduardo Reyes, Miami, FL (US)

( * ) Notice: Subject to any disclaimer, the term of this patent is extended or adjusted under 35 U.S.C. 154(b) by 0 days.

(21) Appl. No.: 17/315,048

(22) Filed: May 7, 2021

(51) Int. Cl.
| | | |
|---|---|---|
| *F21V 21/06* | (2006.01) | |
| *F21V 14/02* | (2006.01) | |
| *F21V 21/30* | (2006.01) | |
| *F21V 21/15* | (2006.01) | |
| *F21W 131/406* | (2006.01) | |
| *G05D 1/00* | (2006.01) | |
| *G05D 1/12* | (2006.01) | |

(52) U.S. Cl.
CPC ............ *F21V 21/06* (2013.01); *F21V 14/025* (2013.01); *F21V 21/15* (2013.01); *F21V 21/30* (2013.01); *G05D 1/0011* (2013.01); *G05D 1/12* (2013.01); *F21W 2131/406* (2013.01)

(58) Field of Classification Search
CPC .......... F21V 21/30; F21V 21/06; F21V 21/15; F21V 21/34; F21V 23/0435; F21W 2131/406
See application file for complete search history.

(56) References Cited

U.S. PATENT DOCUMENTS

| | | | | |
|---|---|---|---|---|
| 4,712,167 A | * | 12/1987 | Gordin | ............. B60Q 1/245 362/233 |
| 8,096,684 B2 | * | 1/2012 | Salm | ............. F21V 21/15 362/272 |
| 8,513,891 B2 | | 8/2013 | Ssieh | |
| 9,109,769 B2 | | 8/2015 | Lee | |
| 9,212,793 B1 | | 12/2015 | Lee | |
| 9,441,820 B1 | | 9/2016 | Linnell | |
| 9,539,952 B2 | * | 1/2017 | Gebhard | ............. B60R 11/00 |
| 9,617,133 B2 | | 4/2017 | Davis et al. | |
| 9,683,722 B2 | | 6/2017 | Quadri et al. | |
| 9,769,911 B2 | | 9/2017 | Lawrenson et al. | |
| 10,274,175 B1 | | 4/2019 | Wood et al. | |
| 10,393,324 B1 | | 8/2019 | Chambers | |
| 2002/0176603 A1 | | 11/2002 | Bauer et al. | |
| 2016/0245490 A1 | * | 8/2016 | Urik | ............. F21V 14/02 |
| 2018/0292809 A1 | * | 10/2018 | Farnik | ............. F21V 21/15 |
| 2019/0346114 A1 | * | 11/2019 | Vavrik | ............. H02K 11/215 |
| 2020/0359486 A1 | * | 11/2020 | Ogawa | ............. H05B 47/155 |

FOREIGN PATENT DOCUMENTS

| | | |
|---|---|---|
| CN | 2204377220 U | 6/2015 |
| CN | 206923115 U | 1/2018 |

\* cited by examiner

*Primary Examiner* — William N Harris
(74) *Attorney, Agent, or Firm* — Albert Bordas, P.A.

(57) ABSTRACT

A remote controlled moving lighting system, which has a lighting system and a movable base assembly, whereby the lighting system is mounted onto the movable base assembly. The lighting system and the movable base assembly are remote controlled and battery-operated to moves on a surface. The lighting system has a light housing, a light base, a lens, a light control panel, and a bracket. The movable base assembly has a base body, a plate, and a plate base. The movable base assembly further has wheels. The lighting system mounts onto the plate of the movable base assembly. The movable base assembly and the lighting system mounted thereon are both remotely controlled independently of each other. The lighting system keeps a focus in a predetermined point while the movable base assembly is able to move in any direction.

17 Claims, 4 Drawing Sheets

REMOTE CONTROLLED MOVING LIGHTING SYSTEM

BACKGROUND OF THE INVENTION

1. Field of the Invention

The present invention relates to lighting systems, and more particularly, to remote controlled moving lighting systems.

2. Description of the Related Art

Applicant believes that one of the closest references correspond to U.S. Pat. No. 9,109,769 B2 issued to Lee on Aug. 18, 2015 for Portable cordless multipurpose lighting system. However, it differs from the present invention because Lee teaches systems and methods for lighting body panels of automobiles to facilitate repair of the body panels, where one embodiment is a portable lighting apparatus that includes a light board, a base and an extension member that connects the light board to the base. The light board is supported by the extension member, which is supported by the base. A battery in the base provides power through conductors in the extension member to light sources in the light board. A slip ring in the extension member couples the conductors together so that they can rotate, thereby allowing the light board to rotate with respect to the base, without twisting the conductors. A suction cup mount on the base enables the base to be secured to an automobile body panel, and the extension member allows the light board to be positioned as desired.

Applicant believes that another reference corresponds to U.S. Pat. No. 9,212,793 B1 issued to Lee on Dec. 15, 2015 for Portable cordless multipurpose lighting system. However, it differs from the present invention because Lee teaches systems and methods for lighting body panels of automobiles to facilitate repair of the body panels, where one embodiment is a portable lighting apparatus that includes a light board, a base, and an extension member that connects the light board to the base. The light board is supported by the extension member, which is supported by the base. A battery in the base provides power through conductors in the extension member to light sources in the light board. The extension member has a conduit that holds the conductors therein and can rotate, thereby allowing the light board to rotate with respect to the base. A suction cup mount on the base enables the base to be secured to an automobile body panel, and the extension member allows the light board to be positioned as desired.

Applicant believes that another reference corresponds to U.S. Pat. No. 9,683,722 B2 issued to Quadri, et al. on Jun. 20, 2017 for Stage light fixture, in particular stage follow spot. However, it differs from the present invention because Quadri, et al. teach a stage light fixture with a light source adapted to emit a light beam; with a main body where the light source is arranged; and with a head articulated with respect to the main body and configured to selectively deflect the light beam coming out from the main body. Please see claim 13, which states " . . . the main body is provided with at least two wheels".

Applicant believes that another reference corresponds to U.S. Pat. No. 9,769,911 B1 issued to Lawrenson, et al. on Sep. 19, 2017 for Lighting system. However, it differs from the present invention because Lawrenson, et al. teach a lighting system comprising: one or more lighting devices operable to emit light into an environment; a controller coupled to the lighting device(s), the controller comprising an input for receiving position and/or orientation information of a wireless communication device; and a wireless receiver coupled to said controller; wherein the controller is configured to: receive parameters from said wireless communications device via the wireless receiver based on a first interaction between a user and the wireless communication device; determine a spot in said environment towards which the wireless communication device is directed based on the received position and/or orientation information; and during a second interaction, track movement of the spot based on the received location and/or orientation information, and control the lighting device(s) to emit light onto a region in said environment defined by the movement of the tracked spot based on at least one of the received parameters.

Applicant believes that another reference corresponds to U.S. Pat. No. 8,513,891 B2 issued to Chung-hsin Ssieh on Aug. 20, 2013 for Wireless light control system with control apparatus and method thereof. However, it differs from the present invention because Sieh teaches a wireless light control system with control apparatus for stage lights and method thereof. The light control apparatus in the wireless light control system communicates with the wireless receiver via a wireless connection. The wireless transmitter transmits the light control command, the scene control command and the procedure control command to the wireless receiver wherein the light control command includes a lighting parameter, a lighting duration parameter, a brightness parameter and light color parameters so that the stage light modules can switches the lighting status, the lighting duration, the brightness and the light colors based on Digital Multiplex 512 (DMX512) of the light control standard protocol. Further, the wireless light control system effectively simplifies the control architecture of the stage light modules.

Applicant believes that another reference corresponds to U.S. Pat. No. 9,441,820 B1 issued to Linnell on Sep. 13, 2016 for Systems and methods for integrating lighting effects with robots. However, it differs from the present invention because Linnell teaches systems and methods for coordination between one or more light sources and one or more robotic devices. The system includes a first device actor including an end effector coupled to a robotic device, where the robotic device has two or more degrees of freedom. The system may further include a second device actor including a movable light source, where the movable light source has at least one degree of freedom. The system may additionally include a control system that is configured to control movements of at least one of the first and second device actors to coordinate movement of a light beam from the movable light source with movement of the end effector.

Applicant believes that another reference corresponds to U.S. Pat. No. 9,617,133 B2 issued to Davis, et al. on Apr. 11, 2017 for Portable support platform system. However, it differs from the present invention because Davis, et al. teach a portable support platform system and method for assembling the system. The portable support platform system includes a support platform configured to receive theatrical devices and an orientation member attached to the support platform. The orientation member includes an arcuate surface configured to receive a flexible member. The flexible member is attached to the orientation member at one or more locations along the arcuate surface to permit orientation and movement of the support platform when the flexible members are deployed or retracted. Comprises "robotic lighting component (107)".

Applicant believes that another reference corresponds to U.S. Pat. No. 10,274,175 B1 issued to Wood, et al. on Apr. 30, 2019 for Systems and methods for controlling the position of a moving light fixture. However, it differs from the present invention because Wood, et al. teach a moving light fixture and method for controlling the position of a moving light fixture. The moving light fixture includes a housing, light sources, a stepper motor, a magnetic position encoder, and an electronic controller. The stepper motor rotates the housing. The magnetic position encoder is configured to transmit a position signal indicating an angular position of the housing. The electronic controller determines the angular position of the housing based on the position signal. The electronic controller also determines a full step of the stepper motor based on the angular position of the housing, and a micro step of the stepper motor. The electronic controller also determines a current position of the moving light fixture based on the full step and the micro step. The electronic controller drives the stepper motor to move the moving light fixture from the current position to a target position.

Applicant believes that another reference corresponds to U.S. Pat. No. 10,393,324 B1 issued to Chambers on Aug. 27, 2019 for High-intensity, telescoping light tower with safety features. However, it differs from the present invention because Chambers teaches a mobile lighting device with extendable boom sections. The boom sections are stored in a horizontal position and then pivot to a vertical position before being extended upward. A light section is positioned at the uppermost end of the last extendable boom section.

Applicant believes that another reference corresponds to U.S. Patent Application Publication No. 2002/0176603 A1, published on Nov. 28, 2002 to Bauer, et al. for Automatic pan/tilt pointing device, luminaire follow-spot and 6DOF 3D position/orientation calculation information. However, it differs from the present invention because Bauer, et al. teach a system and method for automatically tracking objects of interest and aiming or pointing a device capable of pan/tilt movement at the objects as they move in real-time. The system also provides the capability to gather, in real-time or non-real time, information to calculate the position and orientation in three dimensions of the aiming or pointing device. The position and orientation information is characterized by three positional coordinates (x,y,z) and three angular orientation coordinates (Theta, Gamma, and Phi) for a total of six degrees of freedom or 6DOF.

Applicant believes that another reference corresponds to CA Patent No. 2,838,536 A1 published on Jul. 7, 2014 to Densham, et al. for System and method for controlling fixtures based on tracking data. However, it differs from the present invention because Densham, et al. teach systems and methods are provided for using tracking data to control the functions of an automated fixture. Examples of automated fixtures include light fixtures and camera fixtures. A method includes obtaining a first position of a tracking unit. The tracking unit includes an inertial measurement unit and a visual indicator configured to be tracked by a camera. A first distance is computed between the automated fixture and the first position and it is used to set a function of the automated fixture to a first setting. A second position of the tracking unit is obtained. A second distance between the automated fixture and the second position is computed, and the second distance is used to set the function of the automated fixture to a second setting. Mentions: "It is also known that robotic lights can be controlled to automatically follow a certain object based on tracking the object's position. However, accurately tracking the object in real time or near real-time is difficult, and this may lead to a robotic light inaccurately attempting to shine a light on a moving object. Moreover, it is recognized that many control systems for robotic lights are limited to controlling the direction at which a robotic light is pointing".

Applicant believes that another reference corresponds to CN Patent No. 102300358 A issued to Xie Chongxin on Apr. 30, 2014 for Light control system and method for a wireless lighting control device. However, it differs from the present invention because Chongxin teaches a wireless lighting control system with a lighting control device and a method thereof. The lighting control device is connected in a wireless communication manner for being communicated with a receiving unit. A wireless transmitting module is used for transmitting a lighting control command, a scene control command and a program control command to a wireless receiving module so that stage lighting is switched in lighting or extinguishing, lighting or extinguishing time, brightness and lighting colors according to a digital multi-channel transport protocol (DMX512) of a lighting control standard protocol and a control architecture of a stage lighting set is simplified, wherein the lighting control command carries a lighting or extinguishing parameter, a lighting or extinguishing time parameter, a brightness parameter and a lighting color parameter.

Applicant believes that another reference corresponds to CN Patent No. 2204377220 (U) issued to Tan Xiaogang on Jun. 3, 2015 for Stage light fixture system capable of being controlled by mobile phone. However, it differs from the present invention because Xiaogang teaches a stage light fixture system capable of being controlled by a mobile phone, used for controlling a single or a plurality of stage fixtures, and comprises a mobile phone control terminal used for transmitting wifi signals; a stage light fixture is internally provided with a wifi module used for receiving wifi signals, a control main board used for receiving wifi module signals, and a wireless transmitting/receiving module connected to the control main board, used for receiving control signals of the control main board, and emitting 2.4 G frequency signals; the control main board is internally provided with an LED light module, and a cell module used for supplying power for the control main board. The stage light fixture system can employ a mobile phone to control light effects in a wireless way, and has strong mobility; through mobile phone control, the transmission between a mobile phone and a light fixture, and between light fixtures is all performed by wireless transmission signals or 2.4 G frequency signals; each stage light fixture is internally provided with a wireless transmitting/receiving module, so that each stage light fixture can be used as a port for receiving and transmitting signals; meanwhile the built-in cell module is convenient to use and carry.

Applicant believes that another reference corresponds to CN Patent No. 206923115 (U) issued to Jiang, et al. on Jan. 23, 2018 for Stage lamp wireless control system. However, it differs from the present invention because Jiang, et al. teach a stage lamp wireless control system, including communication module, mobile power supply module, stage lighting control module and majestic inferior control module, communication module includes a radio communication unit, the 2nd radio communication unit and DMX transmission unit, the DMX transmission unit links to each other with mobile power supply module, stage lighting control module, majestic inferior control module respectively for the signal transmission of intermodule, mobile power supply module is used for doing respectively communication module, stage lighting control module, majestic inferior control module power supply. This patent cooperates through the two radio communication unit redundancy design of software control and hardware, and automatic selection radio signal converts the DMX signal to the power consumption in non—when performance is reduced in control portable power source's output, realizes stage lighting control, majestic inferior control.

Other patents describing the closest subject matter provide for a number of more or less complicated features that fail to solve the problem in an efficient and economical way. None of these patents suggest the novel features of the present invention.

SUMMARY OF THE INVENTION

The present invention is a remote controlled moving lighting system comprising a lighting system having a light housing and a light base; and a movable base assembly, wherein the lighting system is mounted onto the movable base assembly to be moved remotely on a surface.

The lighting system further comprises a lens, a light control panel, and a bracket. The light base comprises a bottom face and a top face, whereby the bracket is mounted onto the top face. The movable base assembly comprises a base body, a plate, a plate base, and a control panel. The plate comprises posts. The base body defines a cavity to receive the plate base and the plate. The plate and the plate base move vertically. The plate is of a first predetermined diameter and the cavity is of a second predetermined diameter, wherein the first predetermined diameter is smaller than the second predetermined diameter. The movable base assembly further comprises wheels with pulleys, a central pulley, and a belt. The wheels rotate 360 degrees.

The lighting system is mounted onto the movable base assembly, whereby the light base is mounted onto the plate. The posts of the plate engage into the bottom face. The lighting system mounted on the plate rotates with respect to the base body. The base body rotates 360 degrees. The lighting system comprises a wireless digital multiplex system enabling wireless controllability. The lighting system mounted onto the movable base assembly are moved remotely via a remote controller device. The surface is a stage. The movable base assembly and the lighting system mounted thereon are controlled as a single unit, or alternatively independently of each other. The lighting system keeps a focus on a predetermined point while the movable base assembly is able to move in any direction.

It is therefore one of the main objects of the present invention to provide a remote controlled moving lighting system.

It is another object of this invention to provide a remote controlled moving lighting system, which comprises a lighting system and a movable base assembly as a single unit, all in one in a preferred embodiment.

It is another object of this invention to provide a remote controlled moving lighting system, which comprises a lighting system and a movable base assembly alternatively as two units whereby the lighting system removably mounts onto the movable base assembly as an alternate embodiment.

It is another object of this invention to provide a remote controlled moving lighting system that may be controlled utilizing fully wireless technology in a preferred embodiment.

It is another object of this invention to provide a remote controlled moving lighting system that is partially wireless with wireless high voltage power supplied from a unit battery while low voltage is hard wired in an alternate embodiment.

It is another object of this invention to provide a remote controlled moving lighting system that is partially wireless where a low voltage power (signal) is wireless, and the high voltage power is hard wired in an alternate embodiment.

It is another object of this invention to provide a remote controlled moving lighting system that is fully hard wired where both low voltage power (signal) and high voltage power are hard wired in an alternate embodiment.

It is another object of this invention to provide a remote controlled moving lighting system comprising an internal rechargeable power supply for supplying high voltage when wireless.

It is another object of this invention to provide a remote controlled moving lighting system, which moves onto a surface such as a stage and is controlled via a remote controller device.

It is another object of this invention to provide a remote controlled moving lighting system that is volumetrically efficient for carrying, transporting, and storage.

It is another object of this invention to provide a remote controlled moving lighting system that can be readily assembled and disassembled without the need of any special tools.

It is another object of this invention to provide a remote controlled moving lighting system, which is of a durable and reliable construction.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
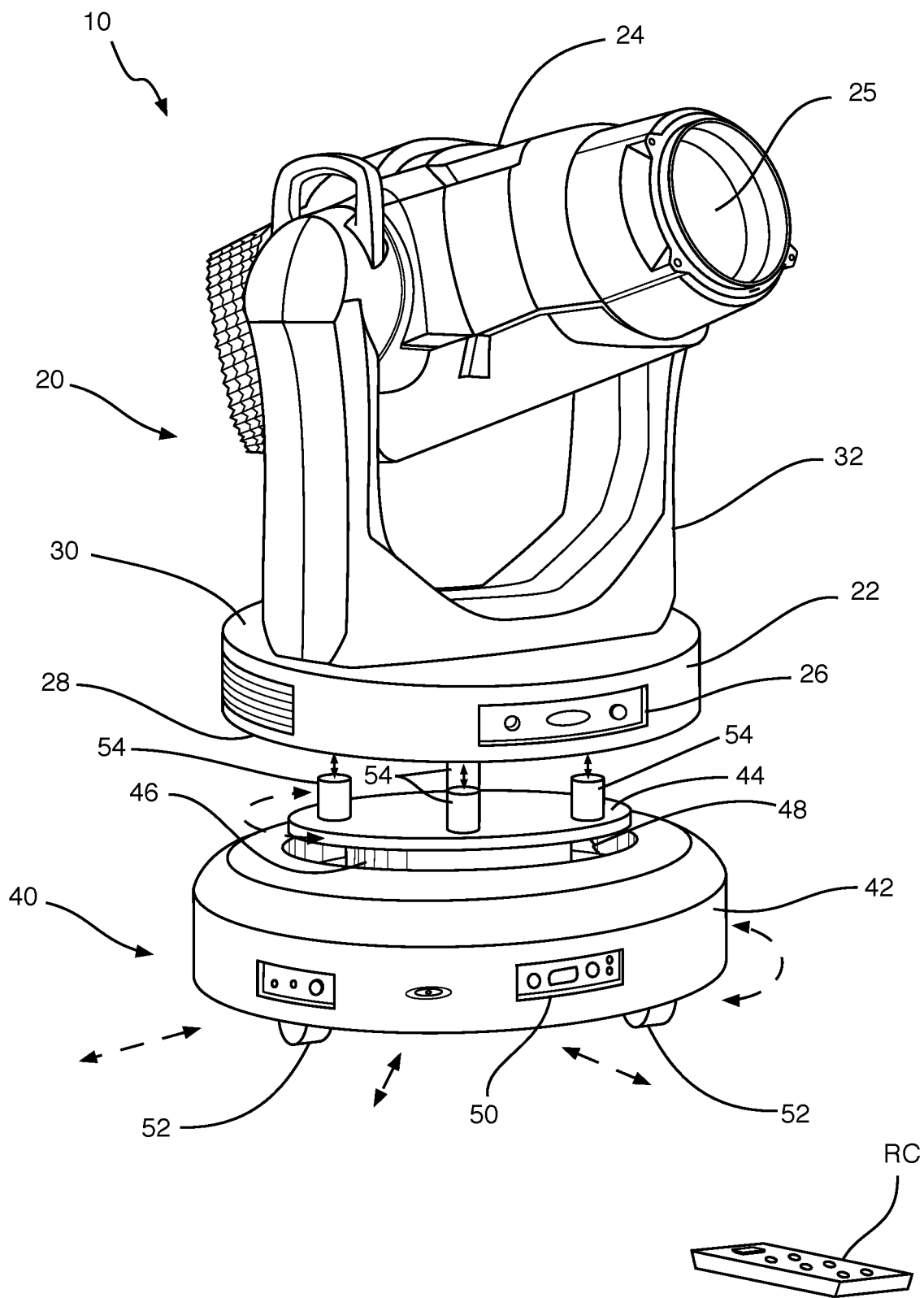
FIG. 1 is an isometric view of the present invention showing a lighting system and a movable base assembly disassembled.

Referring now to the drawings, the present invention is a remote controlled moving lighting system, and is generally referred to with numeral 10. It can be observed that it basically includes lighting system 20 and movable base assembly 40.

Figure 2:
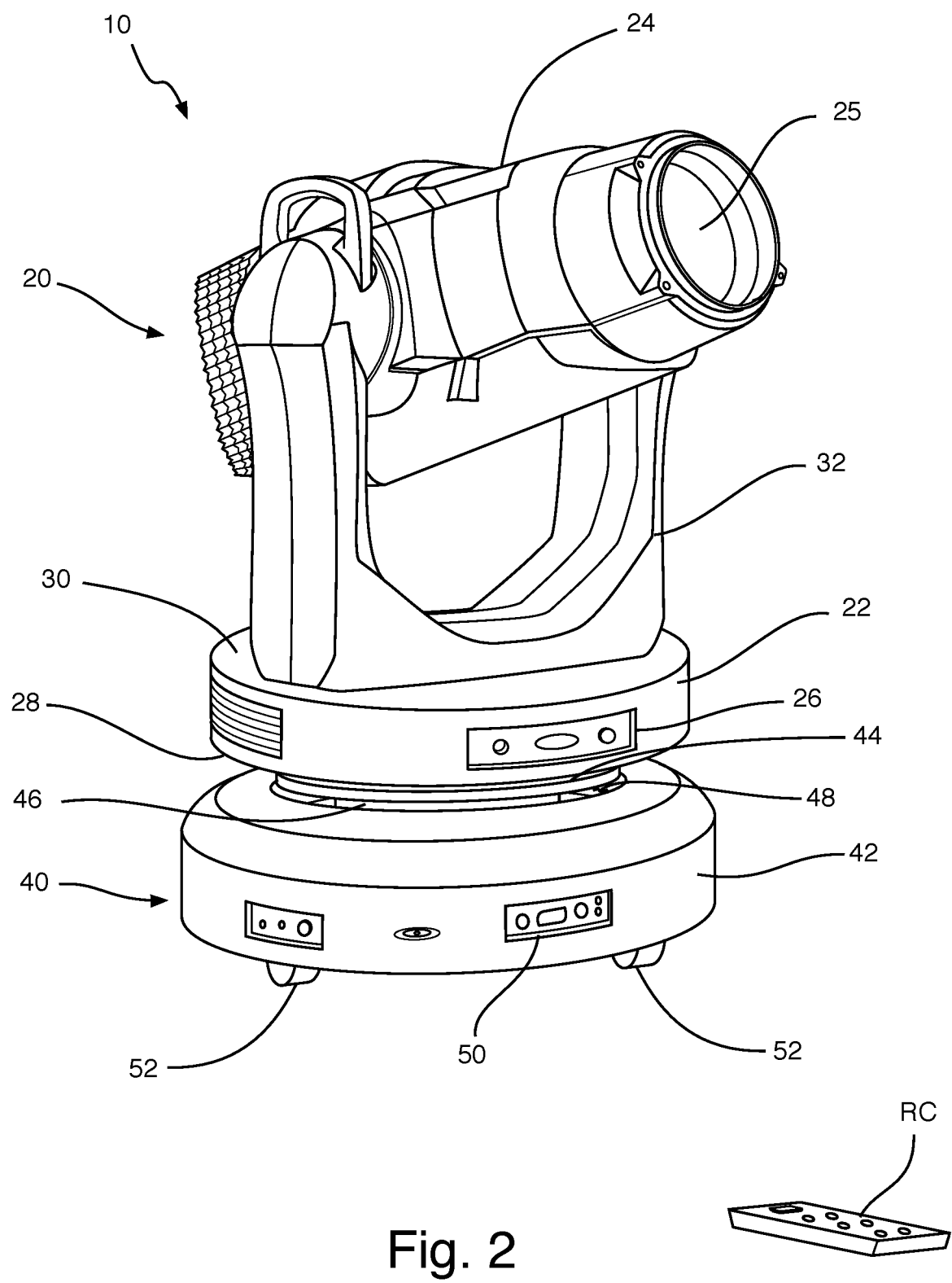
FIG. 2 is an isometric view of the present invention showing the lighting system mounted onto the movable base assembly.

As seen in FIGS. 1 and 2, lighting system 20 comprises light base 22, light housing 24, lens 25, light control panel 26, and bracket 32. Light base 22 comprises bottom face 28 and top face 30. Bracket 32 is mounted onto top face 30. It is noted that lighting system 20 can be defined as an individual theatrical lighting fixture.

Movable base assembly 40 comprises base body 42, plate 44, plate base 46, and control panel 50. Plate 44 comprises posts 54. Base body 42 defines cavity 48 to receive plate base 46 and plate 44. Plate 44 is of a first predetermined diameter, and cavity 48 is of a second predetermined diameter, whereby the first predetermined diameter is smaller than the second predetermined diameter. Lighting system 20 is mounted onto movable base assembly 40, whereby light base 22 is mounted onto plate 44. In a preferred embodiment, posts 54 of plate 44 engage into bottom face 28.

In a preferred embodiment, light base 22 is permanently mounted onto plate 44, whereby lighting system 20 and movable base assembly 40 are a single unit.

In another embodiment, light base 22 is removably mounted onto plate 44, whereby lighting system 20 removably mounts onto movable base assembly 40 as two units.

Lighting system 20 mounted on plate 44 rotates with respect to base body 42. In a preferred embodiment, lighting system 20 mounted on plate 44 rotates 360 degrees. Lighting system 20 comprises a wireless digital multiplex (DMX) system enabling wireless controllability. Present invention 10 moves onto surface S, seen in FIG. 4, being remotely controlled via remote controller device RC. In a preferred embodiment, lighting system 20 and movable base assembly 40 are battery-operated.

Figure 3:
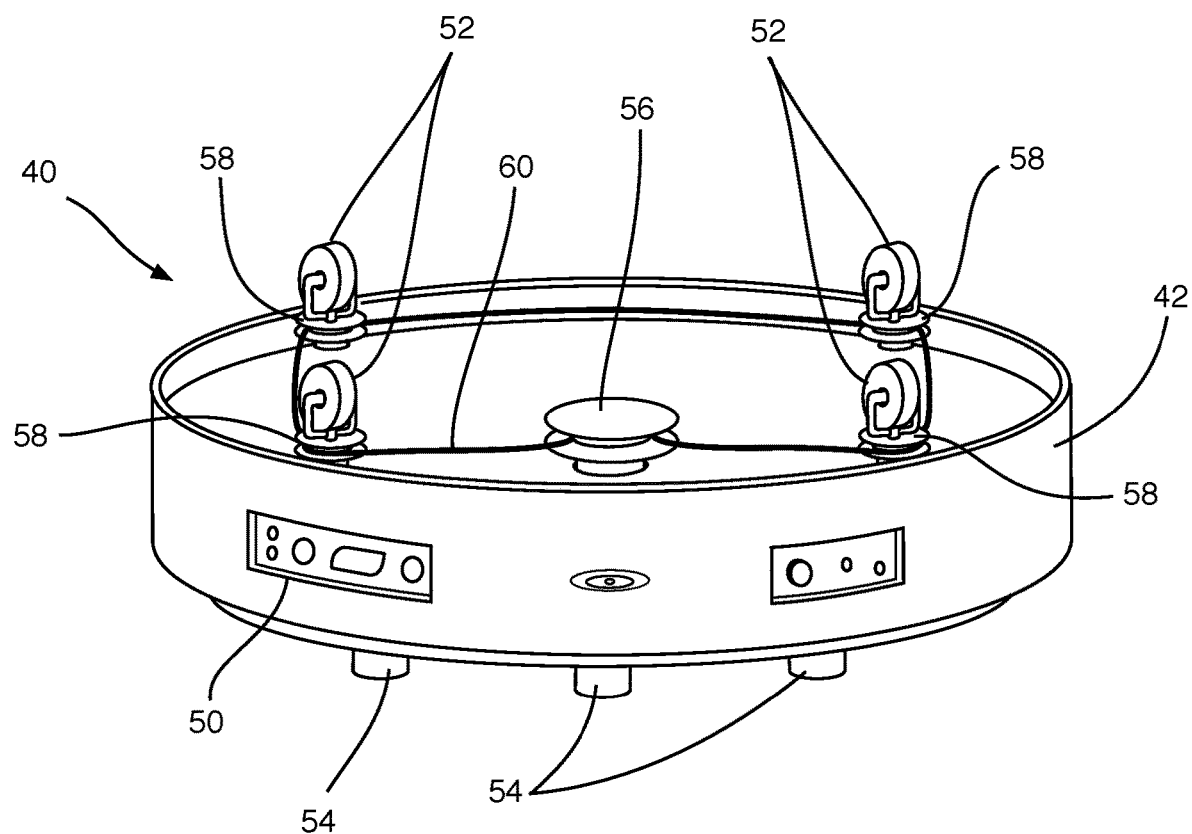
FIG. 3 is a bottom isometric view of the movable base assembly showing a wheel system.

As seen in FIG. 3, movable base assembly 40 further comprises wheels 52 with pulleys 58, central pulley 56, and belt 60. Wheels 52 rotate 360 degrees. In a preferred embodiment, wheels 52 move with motors and pulleys, such as a servo motor pulley system. For ease of illustration some parts have been omitted but it is understood that additional components make up a servo motor pulley system. In a preferred embodiment, wheels 52 enable base body 42 to rotate 360 degrees.

Figure 4:
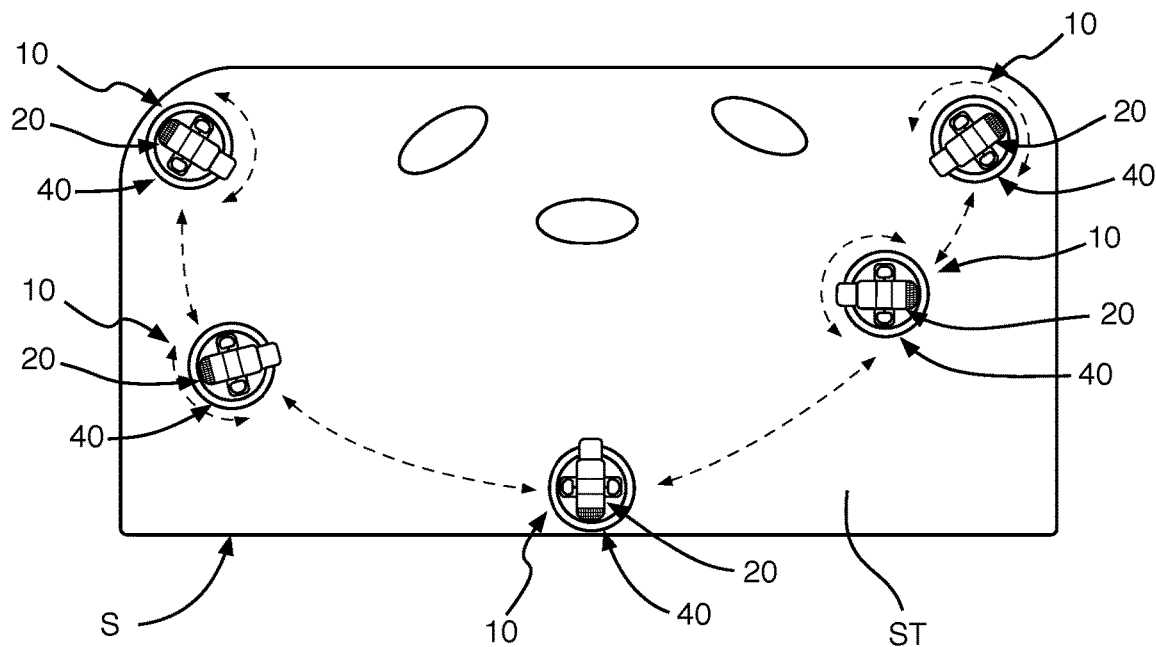
FIG. 4 is a top view of a stage with a plurality of lighting systems mounted onto their respective movable base assemblies, according to the present invention, in use at different positions.
Figure 5:
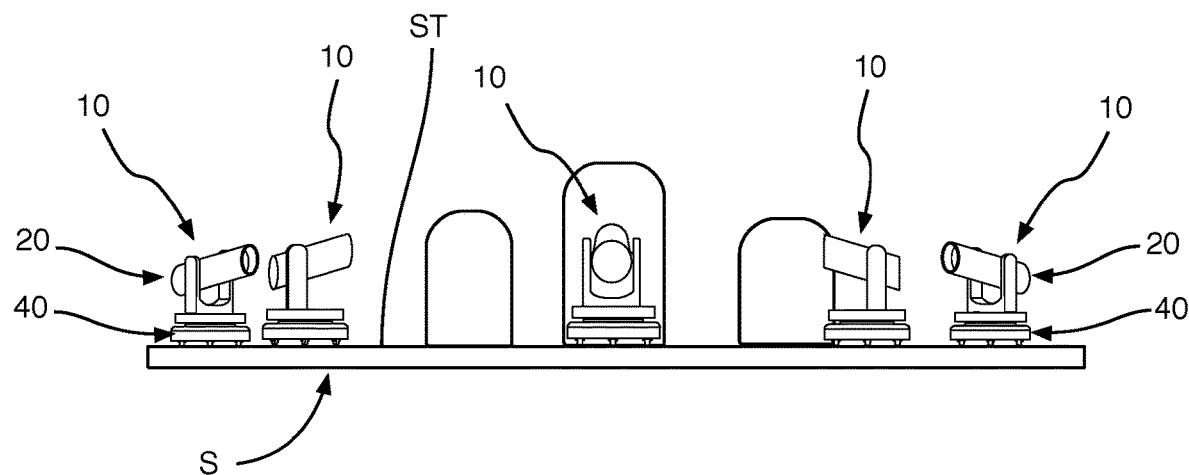
FIG. 5 is a front view of a stage with a plurality of lighting systems mounted onto their respective movable base assemblies, according to the present invention, in use at different positions.

As seen in FIGS. 4 and 5, in a preferred embodiment, present invention 10 is used on surface S such as stage ST, wherein more than one present invention 10 may be used. Present invention 10 is remote controlled, wherein all or some functionalities are controlled by remote controller device RC, seen in FIG. 1. In a preferred embodiment, movable base assembly 40 and lighting system 20 fixed thereon are remotely controlled as a single unit. Alternatively, movable base assembly 40 and lighting system 20 mounted thereon are remotely controlled independently of each other. Present invention 10 is able to move vertically, whereby lighting system 20 mounted onto plate 44 moves vertically.

In operation, lighting system 20 may keep a light focused on a predetermined point, while movable base assembly 40 is able to move in any direction. Present invention 10 may travel/roll anywhere on surface S such as stage ST. As an example, from up stage to down stage, stage left to stage right, down stage to up stage and stage right to stage left, and diagonally in all directions.

In a preferred embodiment, present invention 10 is cordless/wireless. In alternate embodiment, present invention 10 may use cables, cords, or wiring for high voltage for power, and/or low voltage for signals.

More specifically, present invention 10 may be controlled utilizing fully wireless technology in a preferred embodiment.

In an alternate embodiment, present invention 10 may be partially wireless with wireless high voltage power supplied from a unit battery while low voltage is hard wired.

In an alternate embodiment, present invention 10 may be partially wireless where a low voltage power (signal) is wireless, and the high voltage power is hard wired.

In an alternate embodiment, present invention 10 may be fully hard wired where both low voltage power (signal) and high voltage power are hard wired.

In an alternate embodiment, present invention 10 comprises an internal rechargeable power supply for supplying high voltage when wireless.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A remote controlled moving lighting system comprising:
A) a lighting system having a light housing and a light base, said lighting system further comprises a lens, a light control panel, and a bracket, said light base comprises a bottom face and a top face, whereby said bracket is mounted onto said top face; and
B) a movable base assembly, wherein said lighting system is mounted onto said movable base assembly to be moved remotely on a surface, said movable base assembly comprising a base body, a plate, a plate base, and a control panel.

2. The remote controlled moving lighting system set forth in claim 1, wherein said plate comprises posts.

3. The remote controlled moving lighting system set forth in claim 1, wherein said base body defines a cavity to receive said plate base and said plate.

4. The remote controlled moving lighting system set forth in claim 1, wherein said plate and said plate base move vertically.

5. The remote controlled moving lighting system set forth in claim 3, wherein said plate is of a first predetermined diameter and said cavity is of a second predetermined diameter, wherein said first predetermined diameter is smaller than said second predetermined diameter.

6. The remote controlled moving lighting system set forth in claim 1, wherein said movable base assembly further comprises wheels with pulleys, a central pulley, and a belt.

7. The remote controlled moving lighting system set forth in claim 6, wherein said wheels rotate 360 degrees.

8. The remote controlled moving lighting system set forth in claim 1, wherein said lighting system is mounted onto said movable base assembly, whereby said light base is mounted onto said plate.

9. The remote controlled moving lighting system set forth in claim 1, wherein said light base is removable mounted onto said plate.

10. The remote controlled moving lighting system set forth in claim 2, wherein said posts of said plate engage into said bottom face.

11. The remote controlled moving lighting system set forth in claim 1, wherein said lighting system mounted on said plate rotates with respect to said base body.

12. The remote controlled moving lighting system set forth in claim 1, wherein said base body rotates 360 degrees.

13. The remote controlled moving lighting system set forth in claim 1, wherein said lighting system comprises a wireless digital multiplex system enabling wireless controllability.

14. The remote controlled moving lighting system set forth in claim 1, wherein said lighting system mounted onto said movable base assembly is moved remotely via a remote controller device.

15. The remote controlled moving lighting system set forth in claim 1, wherein said surface is a stage.

16. The remote controlled moving lighting system set forth in claim 1, wherein said movable base assembly and said lighting system mounted thereon are controlled independently of each other.

17. The remote controlled moving lighting system set forth in claim 1, wherein said lighting system keeps a focus on a predetermined point while said movable base assembly is able to move in any direction.

* * * * *